May 26, 1953 F. W. TREDUP 2,639,552
PLANT AND FLOWER HOLDER
Filed April 13, 1948
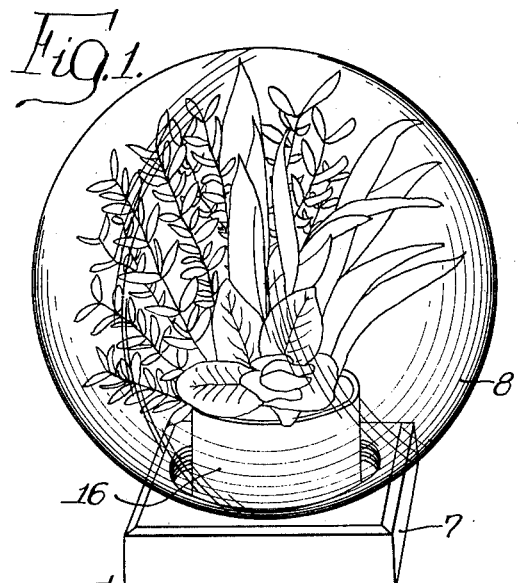
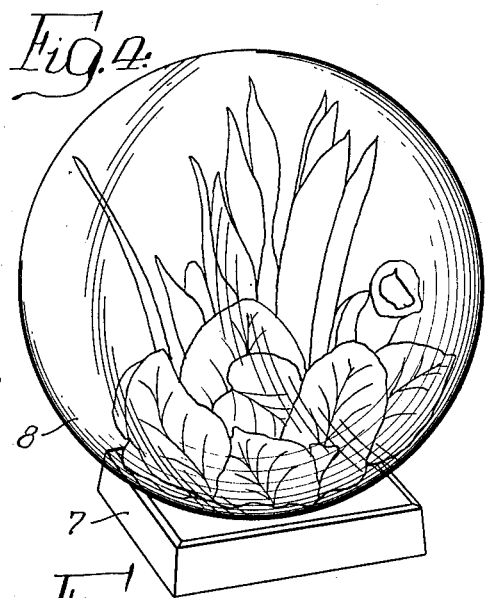
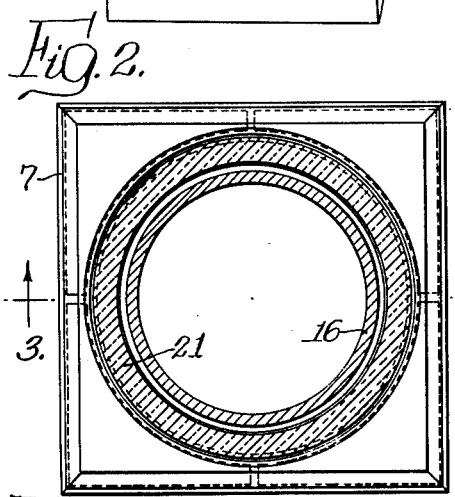
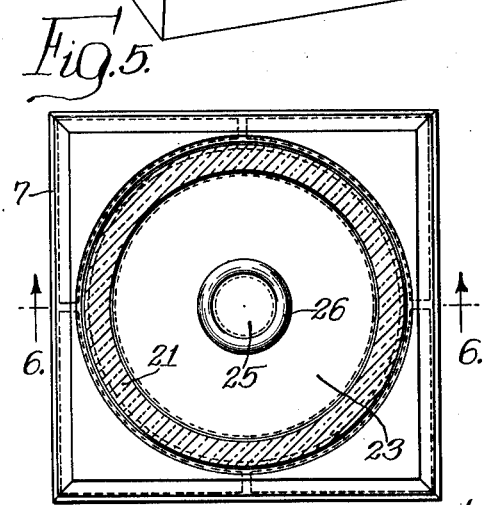
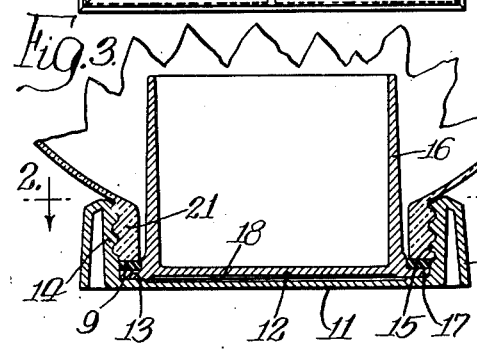
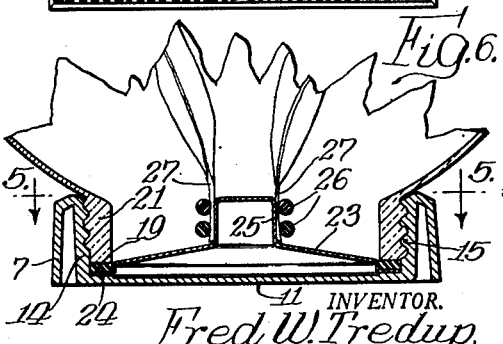
INVENTOR.
Fred W. Tredup,
BY Patented May 26, 1953

2,639,552

UNITED STATES PATENT OFFICE 2,639,552

PLANT AND FLOWER HOLDER

Fred W. Tredup, Chicago, Ill., assignor to A. L. Randall Company, Chicago, Ill., a corporation of Illinois Application April 13, 1948, Serial No. 20,682

1 Claim. (Cl. 47—41)

This invention relates to holders and protectors for indoor keeping of flowers and plants whereby various floral arrangements, whether of flower or plant material, may be composed and held in complete protection, not only without obscuring, but while actually enhancing the natural beauty of the material and, in the case of certain types of growing plants, as distinguished from cut flowers and the like, while aiding the plant to grow by simulating a more natural environment than the ordinary house or room would provide.

One of the primary objects of the invention is to provide a device of the character specified which will both serve to protect and hold floral material in a desired arrangement and also to display that material in an attractive and appealing manner.

Another object is to provide a device of the character mentioned of such construction that it may be used either as a flower or plant material "aquarium," that is, as a device in which the flower or plant material may be wholly submerged in water, but without danger of water leakage. Devices of this character are not broadly new, but the instant device constitutes and embodies substantial improvement thereover.

Still another object is to provide a device of the instant character which may be used either as an "aquarium" for floral material or as a miniature "conservatory" or "green house" for potted or otherwise situated growing plants as distinguished from cut material, the arrangement and construction being such that only slight effort is required to adapt the device to either use.

Another important object is to provide a device which will be attractive, which will enhance the appearance of the plant material carried, which will not leak water or permit soil or other debris from escaping, which may be easily used and transported, and which will have many other advantages as will become apparent after reading the following description and claim and after viewing the drawings in which:

Fig. 1 is a perspective view of a preferred embodiment of the invention showing a transparent globe mounted on a base and housing a potted plant disposed on the base within the globe;

Fig. 2 is a view, partly in top plan and partly in section, showing the supporting base member, the plant holder or carrier cup and the relationship between the cup, the base and the neck of the globe, the view corresponding to a section on the line 2—2 of Fig. 3;

Fig. 3 is a view in section taken along the section line 3—3 of Fig. 2, with portions of the globe broken away; and Figs. 4, 5 and 6, are views respectively corresponding to the views of Figs. 1, 2 and 3, of the device with a modified type of carrier for securing cut flowers or other materials, in a desired quantity and arrangement, within the device and wholly or partially submerged in water therein.

The major elements of the floral device comprise a supporting base or stand 7 which may be composed of any suitable material, but preferably of a light but strong plastic, and which may be formed in any desired manner and ornamental design, a globe 8 composed of transparent glass or plastic, a suitable plant or plant material carrier to which more specific reference will be made hereinafter, and a gasket 9 of rubber or other suitable water impervious material. The supporting base or stand 7 is provided with a well-like cavity, preferably centrally located, the bottom wall 11 of which has a relatively flat internal surface 12 except for a raised and perimetrically extending flat step 13. The cavity is bounded by a substantially cylindrical side wall 14 which has an internally projecting thread 15 cut or molded thereon. Of course, the side wall and the bottom wall of the cavity should be water impervious.

Fitting within the cavity is a substantially cylindrical cup 16 which in itself may serve as a pot for a plant or which may serve as a carrier for a pot or other receptacle in which floral material is planted or disposed. Whether the cup or carrier 16 is of cylindrical or other shape is relatively immaterial, although it is of a depth or height to project above the top of the recess of the supporting base 7 and the top of any pot holding a plant, has a circumferentially extending flange 17 which, preferably, makes a fairly close fit with the bottom portion of the inside of the cylindrical side wall 14 and seats circumferentially upon the step 13, and, preferably, has a slightly recessed or relieved bottom wall as indicated at 18. The upper surface of the flange 17 is also flat for reception of the ring gasket 9 of rubber or other suitable material which should fit snugly against the carrier and against the side wall defining the cavity in the supporting member or stand 7. The carrier may be made of a plastic material or of metal or other material, but must be water-tight as will be understood.

The globe 8 here shown of spherical contour but which may be of cube or other desired shape, is provided with a neck 21 which, preferably, has a greater wall thickness than the body thereof, and, if made of molded glass, will have the external thread 22 molded integral therewith, but, if made of plastic, the thread may be molded or cut. In any event, the threads 22 must have the same pitch, etc., to permit them to mate with the thread 15 on the supporting base or stand. A bayonet connection (pins and slot) is considered to be the equivalent of a thread. With the plant receiver and gasket in place, the globe and supporting base are rotated relatively to engage the threads 14 and 22, and until the lip of the neck 21 makes tight engagement with the gasket 9 to provide a water-tight connection.

The modified carrier shown in plan in Fig. 5 and in vertical section in Fig. 6, consists of a dished disc 23 which, preferably, is made of brass or other suitable metal, although it may be made of plastic or other material. Disc 23 has a downwardly stepped circumferential flange 24 adapted to seat upon the step 13 of the supporting base 7 and, together with the internal wall of the cavity of the base, to form a circumferential channel for the reception of a gasket 19 which, in this case, may be cemented to the disc flange 24. Central of the top of the disc 23 is a generally cylindrical boss or projection 25 of substantial height against which the stems or other portions of floral material (flowers, leaves, stems, etc.) to be displayed are clamped and held by one, two or more resilient rubber or other material rings 26. Fig. 6 illustrates plant or flower stems 27 held against the boss or projection 25 by the resilient but soft rubber bands 26. The bands 26 should be so constructed that they exert a fairly firm pressure, so as to hold the flower stems in the positions desired, but they should not exert enough pressure as to prevent the stem from absorbing water through its capillaries.

As shown in Fig. 1, a potted plant or group of plants may be set within the receiver or carrier cup 16 and the globe screwed down to effect a seal. While external changes of temperature will have some influence on the temperature of the air trapped within the globe, the temperature fluctuations within will be minimized. Condensation, on the inside of the globe, of water transpired by the plant within will reduce the water available for the plant, but such reduction will be very gradual and may extend over a long period of time, thereby reducing the frequency with which re-watering is required. Dust and noxious gases inimical to the plant will be excluded and the globe will act much after the manner of a conservatory as well as be ornamental.

Cut flowers secured to the carrier 23 in the manner illustrated in Fig. 6, may be arranged in a display such as shown in Fig. 4, whereupon they, together with the carrier may be inverted and the flowers introduced into the globe, which previously may have been filled with water to some point short of the neck. By canting the carrier and the flowers and working them around, air entrained or entrapped may be displaced, whereupon any additional water to fill the globe to the top of the neck to exclude all air may be added. Thereafter the disc carrier with its gasket in place may be placed over the mouth of the globe, the gasket being disposed against the lip of the mouth to effect a seal. The base member is turned to inverted position and screwed down upon the neck until the gasket effects a tight and secure seal. Then the assembly may be righted and stood upon the supporting base.

It will be appreciated that I have provided a novel and useful floral display device having many advantages. Since it is susceptible of variations and changes, I desire not to be limited to the exact form of features described and shown, but only by the scope of the appended claim.

I claim:

A flower and plant holder comprising a supporting member provided with spaced, continuous and depending walls the outer of which is angularly arranged and providing a substantially rectangular base and an internal, substantially cylindrical wall defining an upwardly opening and centrally arranged cavity therein, the interior, cylindrical wall defining said cavity having an internally projecting thread generated about the vertical axis of the cavity, said spaced walls and the bottom wall of the cavity being continuous, integral and imperforate, a centrally disposed flower and plant holding assembly projecting upwardly in said cavity and consisting of an upstanding projection for receiving the stems of the flowers and plants about its peripheral surface and one or more resilient bands adapted to encompass the stems of the flowers and plants and retain them clamped and in fixed position against the peripheral surface of the upstanding projection, an annular gasket seated in the cavity against the circular side wall at the base thereof, and a transparent globe having an open end with an externally threaded neck portion threadedly engaged with the thread of said side wall and when in assembled relation upon the supporting member the end of the neck portion bears against and effects a water-tight sealing engagement with said gasket.

FRED W. TREDUP.

References Cited in the file of this patent

UNITED STATES PATENTS

| Number | Name | Date |
| --- | --- | --- |
| Re. 20,289 | Simpson | Mar. 9, 1937 |
| 1,427,180 | Welch | Aug. 29, 1922 |
| 1,681,040 | Kemp | Aug. 14, 1928 |
| 1,741,692 | Garaja | Dec. 31, 1929 |
| 2,155,811 | Tredup | Apr. 25, 1939 |

FOREIGN PATENTS

| Number | Country | Date |
| --- | --- | --- |
| 137,123 | Great Britain | Jan. 8, 1920 |
| 507,483 | Great Britain | June 15, 1939 |